United States Patent [19]

Thorgersen et al.

[11] Patent Number: 5,669,692

[45] Date of Patent: Sep. 23, 1997

[54] FIBER OPTIC LIGHTING SYSTEM

[75] Inventors: Harold Thorgersen; Jose Santana; Andrew C. Ledesma, all of Woodbury; Surendar K. Bhan, Watertown; Lyman Daigle, Bethlehem, all of Conn.

[73] Assignee: Timex Corporation, Middlebury, Conn.

[21] Appl. No.: 560,065

[22] Filed: Nov. 17, 1995

[51] Int. Cl.$^6$ ....................................................... G01D 11/28
[52] U.S. Cl. ................... 362/26; 362/29; 362/30; 362/32; 385/123; 385/901
[58] Field of Search ..................... 362/26, 32, 29, 362/30, 23; 385/31, 123, 901, 32; 116/286, 287, 288, DIG. 5, DIG. 36

[56] References Cited

U.S. PATENT DOCUMENTS

| | | |
|---|---|---|
| 2,140,972 | 12/1938 | Rylsky. |
| 2,188,821 | 1/1940 | Rylsky. |
| 2,275,621 | 3/1942 | Gardinor. |
| 2,480,393 | 8/1949 | Bossert et al. ............... 362/32 |
| 3,043,038 | 7/1962 | Marble. |
| 3,043,947 | 7/1962 | Albinger. |
| 3,561,145 | 2/1971 | Shotwell. |
| 3,748,456 | 7/1973 | Brien ........................... 362/26 |
| 4,775,964 | 10/1988 | Alessio et al.. |
| 4,807,090 | 2/1989 | Mandellos et al. ........... 362/26 |
| 5,406,462 | 4/1995 | Fallahi et al. ................ 362/32 |
| 5,542,016 | 7/1996 | Kaschke ....................... 362/32 |

OTHER PUBLICATIONS

"AND" Product Description of Fiber Optic Backlight, LCD Dot Matrix Modules.

Narinder S. Kapany, Fiber Optics, Scientific America, pp. 72–81 Nov. 1960.

*Primary Examiner*—Thomas M. Sember
*Attorney, Agent, or Firm*—William C. Crutcher

[57] ABSTRACT

A lighting system utilizing an optical fiber is provided. In the preferred embodiment of the present invention, light rays from a light source are focused into an outer end of the optical fiber wound in a spiral shape. The light rays are focused in by a ball lens. In one embodiment, the spiral shape optical fiber is enclosed by a casing having a reflective inner surface along the periphery and the bottom; however, there is an aperture in the casing to permit light rays from the light source to reach the outer end of the spiral shape optical fiber.

8 Claims, 11 Drawing Sheets

FIBER OPTIC LIGHTING SYSTEM

BACKGROUND OF THE INVENTION

This invention relates to an improved system for lighting using an optical fiber.

Numerous systems have been proposed for providing lighting. One such system is disclosed in U.S. Pat. No. 3,043,947 ('947) issued on Jul. 10, 1962 to H. Albinger, Jr. The '947 patent discloses a lighting system for a dial, such as a dial for a timepiece, which comprises a lamp 8 within a lamp holder 3, a light transmitting lens plate 1 having a plurality of semi-spherical depressions 10 in the front surface, and a reflector 11. This is shown in FIG. 1. Light rays emanating from the lamp 8 are intercepted by the semi-spherical depressions 10 which reflect the light rays mostly toward the reflector 11. The reflector 11, in turn, reflects the light rays through the front surface of the lens plate 1. A dial, which is mounted on the front surface of the lens plate 1, is thereby illuminated.

The problem with the lighting system disclosed in the '947 patent, as well as other lighting systems utilizing a single light source, has been the difficulty encountered in providing uniform illumination. Generally, the area adjacent the light source is the brightest, with areas furthest from the light source being the dimmest. Employing two or more light sources alleviates this problem, but generally does not remove it. Furthermore, utilizing more light sources requires more components and more power.

To overcome these problems, electroluminescent lamps have been utilized in recent times to provide lighting. Electroluminescent lamps, as is well-known, function by the application of an electrical potential to two electrodes which "sandwich" a layer of electroluminescent particles. Since the application of the electrical potential causes each of the electroluminescent particles to become energized and emanate light, the illumination derived therefrom is uniform. An example of a lighting system utilizing an electroluminescent lamp is U.S. Pat. No. 4,775,964 ('964) issued on Oct. 4, 1988 to Alessio et al. and assigned to the present assignee. The '964 patent discloses an electroluminescent lamp with timekeeping indicia printed on the top surface, such that the electroluminescent lamp also serves as a dial for an analog watch.

Another recent attempt to achieve uniform illumination for lighting purposes involves the use of optical fibers. As is known, an optical fiber consists of a core having a high refractive index and cladding covering the core which has a lower index of refraction than the core itself. Also, to make the optical fiber stronger and to prevent damage to the cladding, it is common to cover the cladding with a jacket which is usually some type of plastic material. Light rays are introduced into the core of the optical fiber. Since the index of refraction for the cladding is lower than the index of refraction for the core, light rays are generally kept inside the core. However, by bending or otherwise manipulating the optical fiber, it is possible to make light rays pass through into the cladding and escape from the optical fiber. This phenomenon will be described further in connection with the description of the preferred embodiment of the present invention below. An example of a fiber-optic lighting system is Lumitex Inc.'s "Fiber Optic Backlight". The Fiber Optic Backlight comprises acrylic optical fibers woven together to form a light-emitting panel. The panel is connected to a light source. As the light passes through the panel, computer-controlled "micro-bends" cause the transmitted light to exceed the critical angle of the fibers' core-cladding interface (the concept of the critical angle will be described below). This permits the light to leave the optical fibers without physical interruption of the cladding surface.

Although uniform lighting via electroluminescent lamps or optical fibers has proven satisfactory, it is desired to provide an even simpler, more cost effective means of lighting than what is presently available.

Accordingly, it is the object of the present invention to provide an improved lighting system which utilizes an optical fiber to uniformly distribute light received from a light source.

SUMMARY OF THE INVENTION

Briefly stated, the invention in its broadest form concerns a lighting system, which comprises an optical fiber wound in a spiral shape comprising a plurality of turns, the spiral shape optical fiber having an outer end; a light source; and means for focusing the light from the light source to the outer end of the spiral shape optical fiber.

DRAWINGS

The invention, both as to organization and to method of practice, together with further objects and advantages thereof, will best be understood by reference to the following specification, taken in connection with the accompanying drawings, in which:

FIG. 1 illustrates a lighting system for a dial disclosed as FIG. 3 in U.S. Pat. No. 3,043,947;

DETAILED DESCRIPTION OF THE PREFERRED EMBODIMENT

Figure 1:
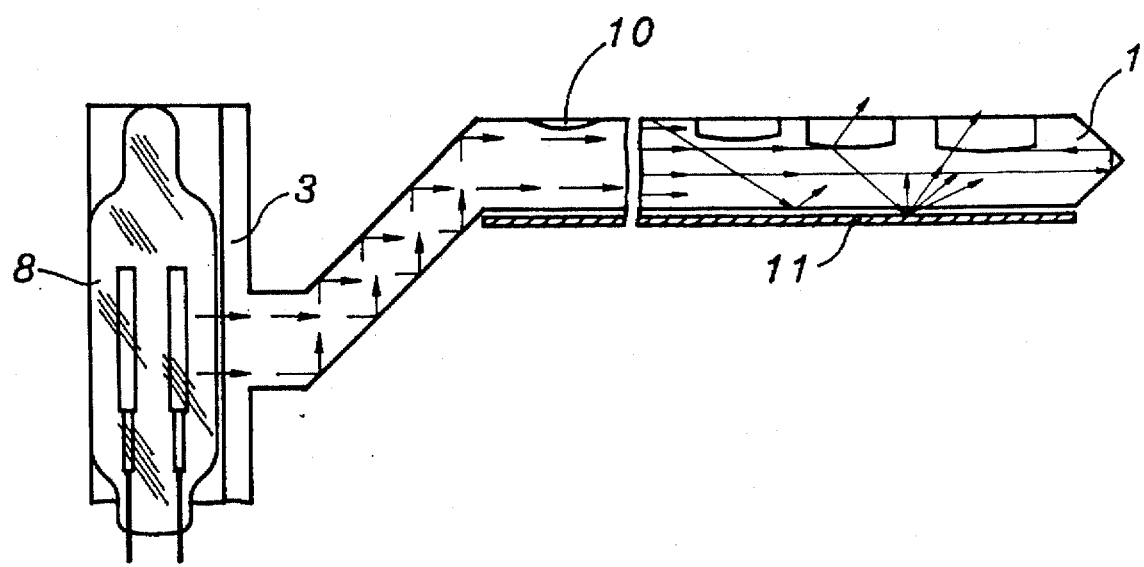
Figure 2:
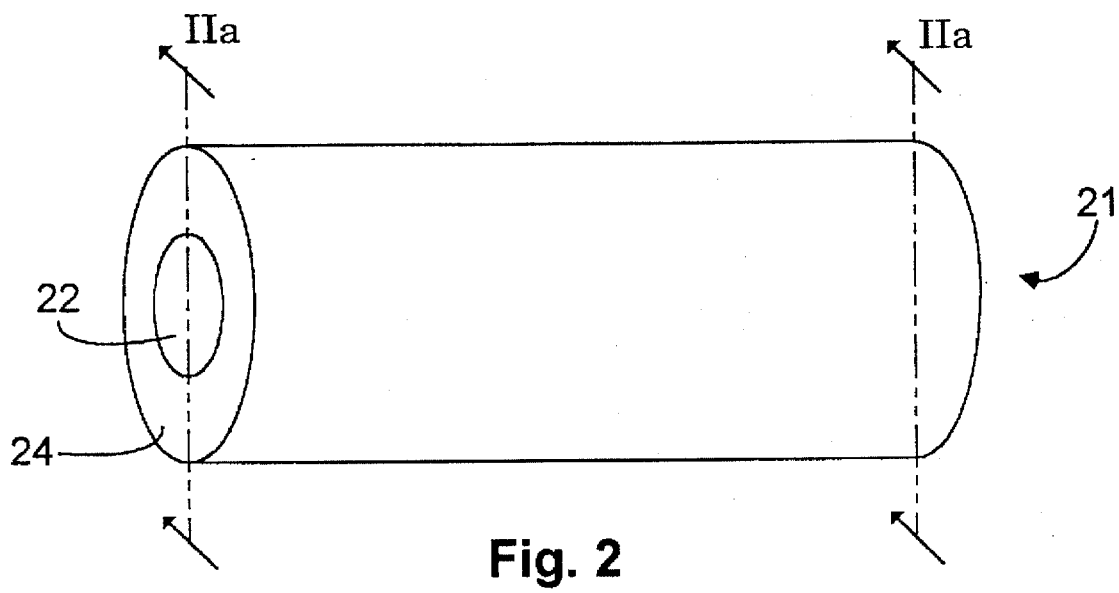
FIG. 2 shows a portion of an optical fiber.
Figure 2A:
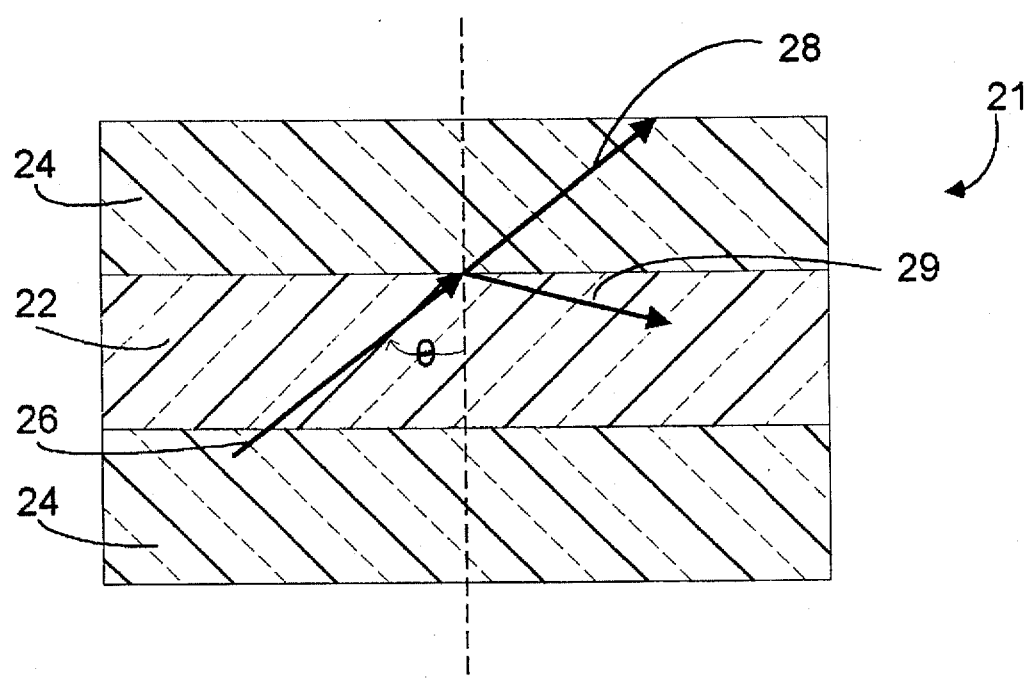
FIG. 2a is a cross section along lines IIa–IIa of FIG. 2.

Before discussing the preferred embodiment of the present invention, the well-known phenomenon associated with light traveling along an optical fiber will be described. FIG. 2 shows a portion of an optical fiber 21 having a core 22 and cladding 24. The size of the optical fiber 21 has been greatly exaggerated to better illustrate its structure. Generally, the diameter of an optical fiber is on the order of a hundredth of a millimeter (e.g., an optical fiber comprising a scanner in robotics may be 0.07 mm in diameter). Referring now to FIG. 2a, the portion of the optical fiber 21 is shown in cross section along lines IIa—IIa of FIG. 2. A light ray traveling within the core 22 is illustrated by arrow 26. When the light ray 26 is incident at the core-cladding interface, its subsequent direction is determined by the angle of incidence $\theta$ vis-à-vis the critical angle $\theta_c$. The value of $\theta_c$ is derived from Snell's Law, and it is given by $$\theta_c = \sin^{-1} n_2/n_1$$

where $n_2$ is the refractive index of the cladding and $n_1$ is the refractive index of the core. Let's assume for purposes of an example that $n_2=1$ and $n_1=1.5$. This means that $\theta_c=41.8°$. If the angle of incidence $\theta$ is less than the critical angle $\theta_C$ (41.8° in this case), then light ray 26 will pass through the core 22 into the cladding 24, as shown by arrow 28. If the angle of incidence $\theta$ is equal to or greater than the critical angle $\theta_C$, then light ray 26 will remain within the core 22, as shown by arrow 29. Note that light ray 28 which passes through the core 22 into the cladding 24 may pass outward into space, depending upon the angle at which the ray 28 strikes the interface between the cladding 24 and space.

Figure 3:
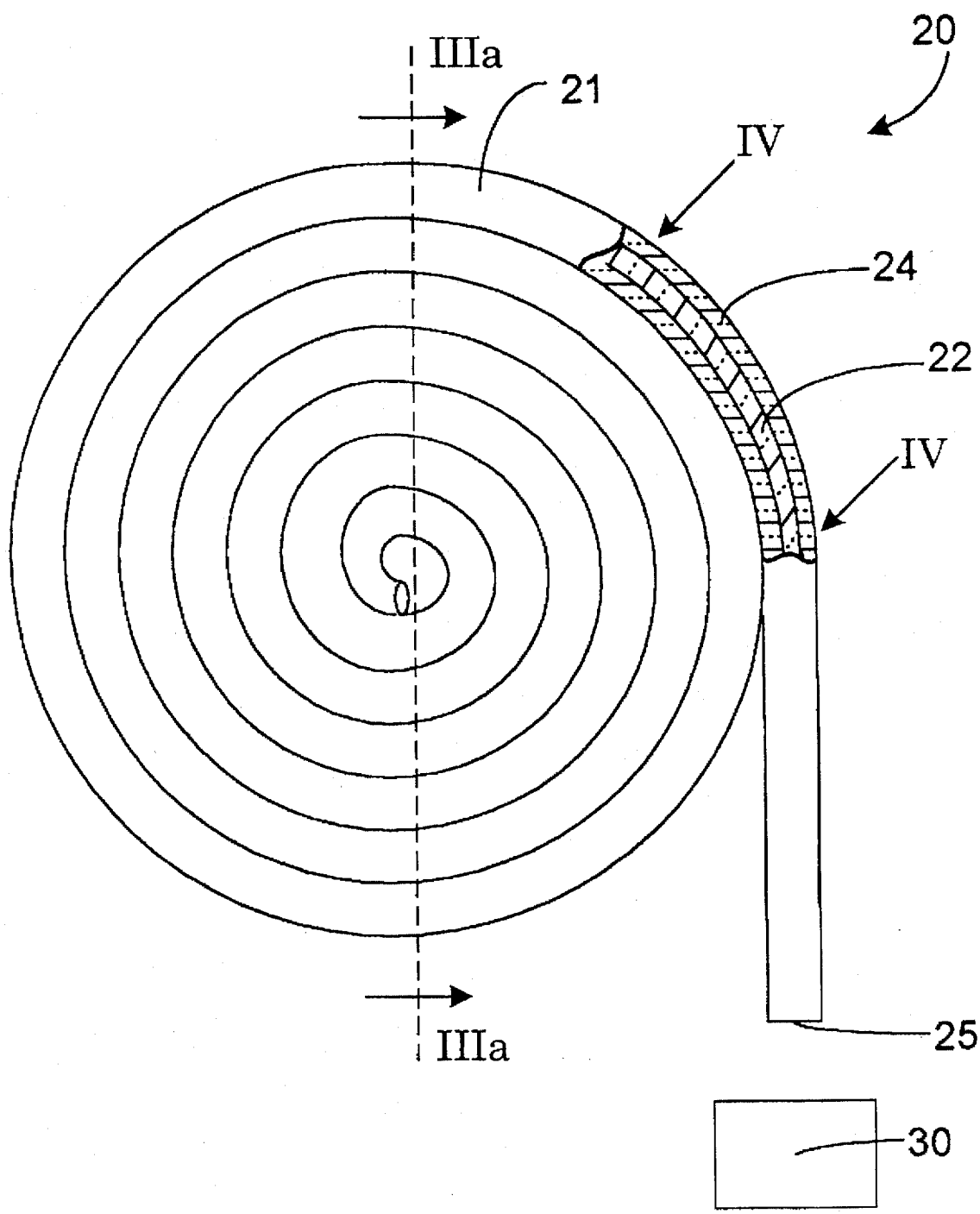
FIG. 3 is a top view of a first embodiment for the lighting system of the present invention.
Figure 3A:
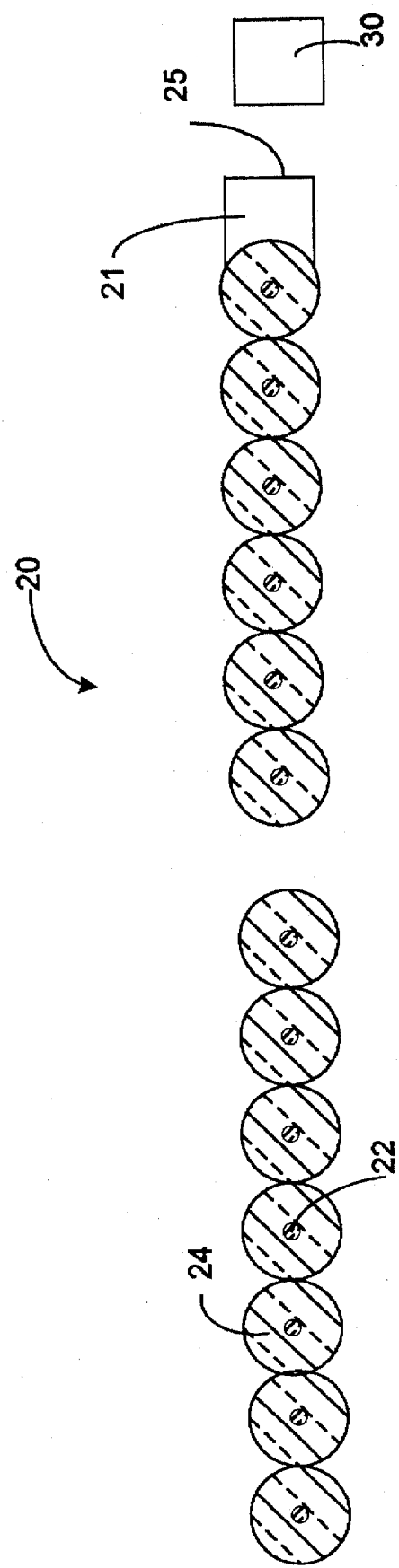
FIG. 3a is an enlarged cross-sectional side view along lines IIIa–IIIa of FIG. 3.

FIG. 3 is a top view of a first embodiment for the lighting system 20 of the present invention. There is shown the optical fiber 21 wound in a spiral shape and a light coupling means 30 positioned proximately to an outer end 25 of the optical fiber 21. It should be understood that the optical fiber 21 and the light coupling means 30 have been greatly exaggerated in size for illustration purposes. The light coupling means 30 includes a light source and a means for focusing the light from the light source to the core 22 at the outer end 25 of the optical fiber 21. A detailed description about the light coupling means 30 will be given hereinbelow. FIG. 3a is an enlarged cross-sectional side view along lines IIIa—IIIa of FIG. 3.

Figure 3B:
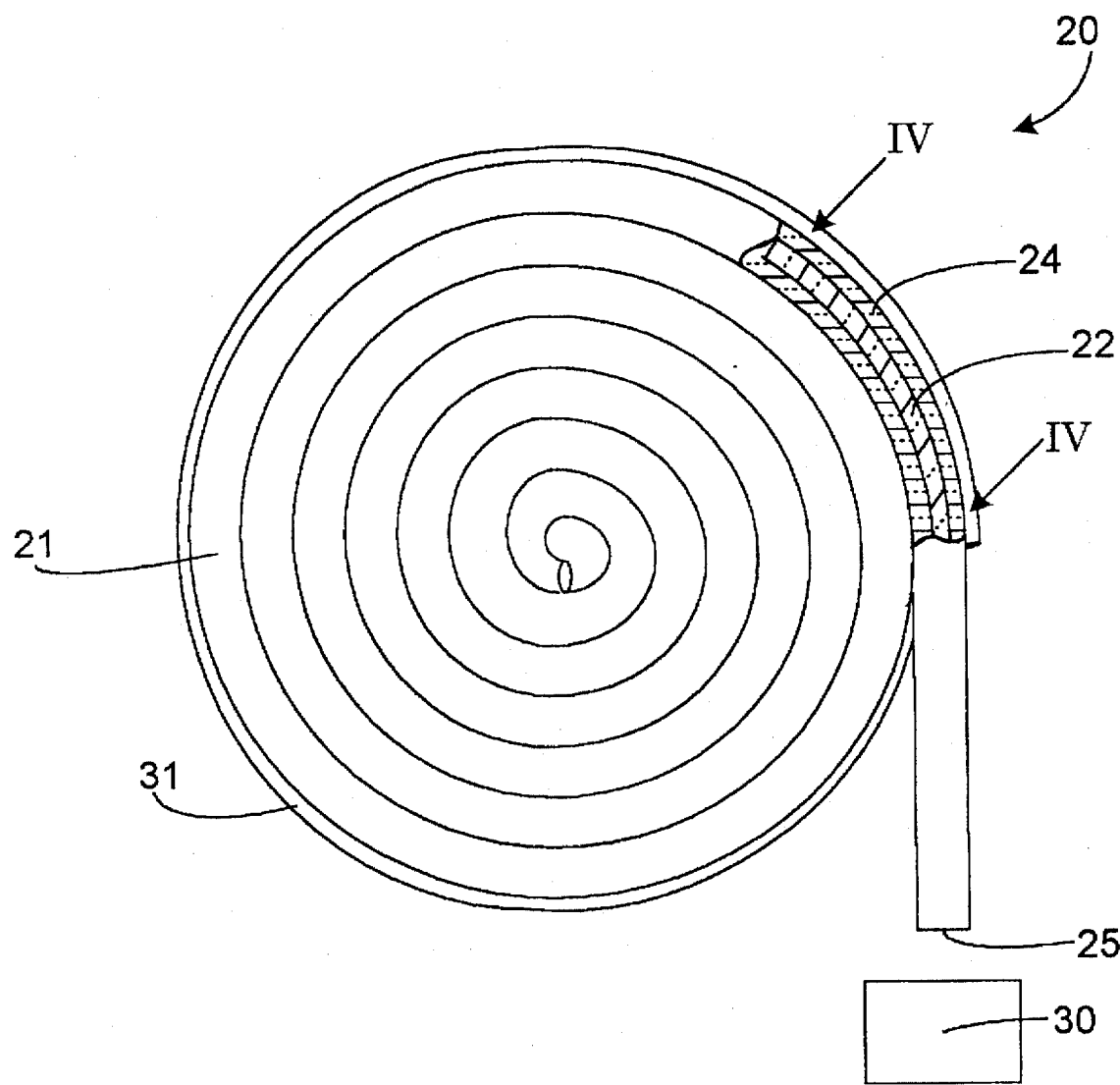
FIG. 3b is a top view of a second embodiment for the lighting system of the present invention.

FIG. 3b is a top view of a second embodiment for the lighting system 20 of the present invention. As illustrated therein, a casing 31 encloses the spiral-shaped optical fiber 21 along the periphery (except for an aperture to permit the outer end 25 of the optical fiber 21 to receive light from the light coupling means 30), as well as the bottom (not visible in FIG. 3b). The casing 31 has a highly reflective inner surface so that light rays escaping from the optical fiber 21 may only leave the lighting system 20 through the top. In this manner, virtually all of the light rays emanating from the lighting system 20 of the present invention are used to illuminate whatever is positioned on top of the casing 31. The reflective inner surface of the casing 31 may comprise a mirror, aluminum foil, or other reflective materials.

Figure 4:
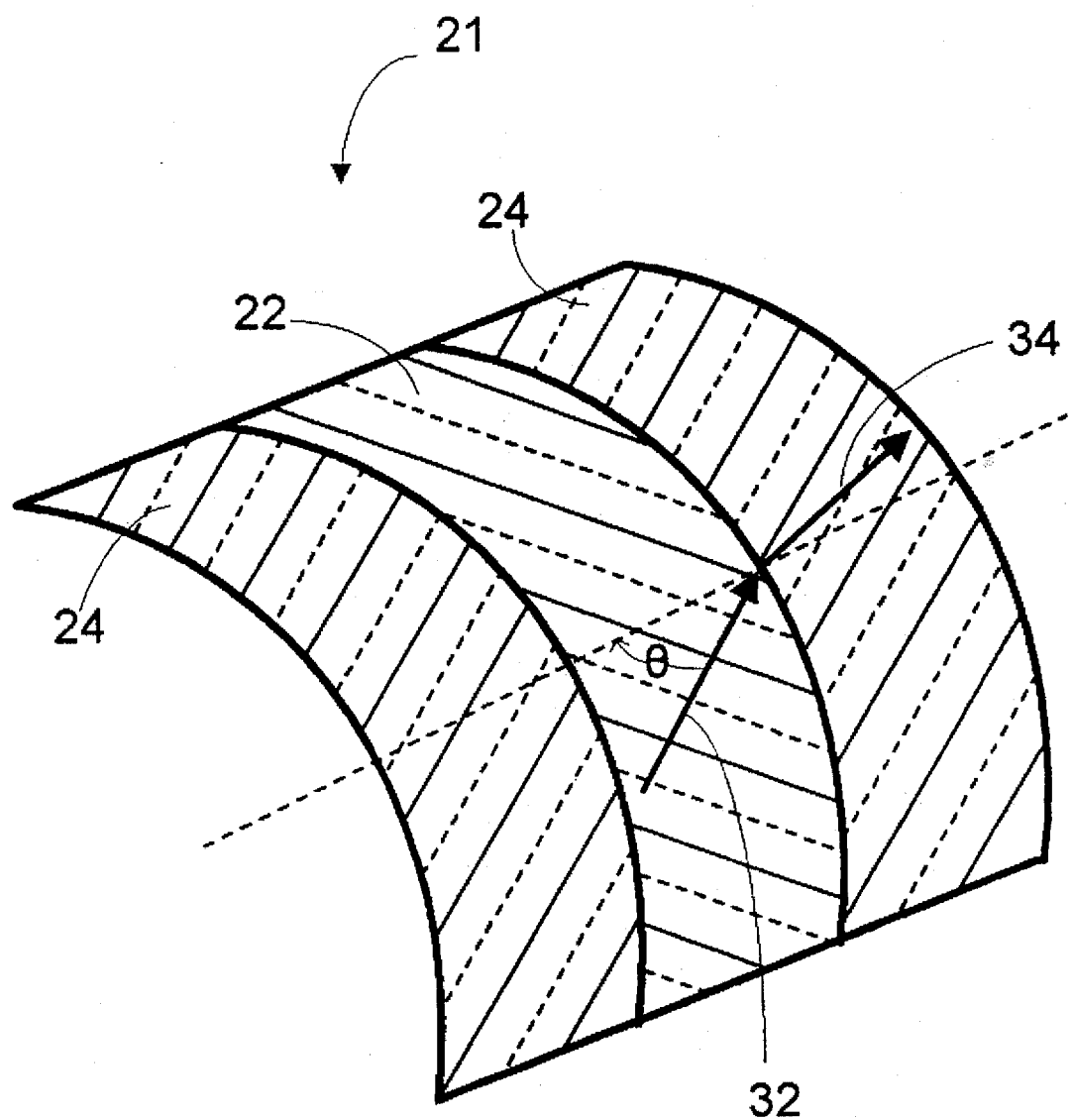
FIG. 4 is a magnified top view of the cut away portion of FIGS. 3 and 3b along arrows IV—IV.

As light rays travel through the core 22 of the optical fiber 21 which is wound in a spiral shape, some of the light rays will pass through the core-cladding interface and escape from the optical fiber 21. This is because the bending of the optical fiber 21 causes some light rays to be incident at the core-cladding interface at angles which are less than the critical angle $\theta_C$. FIG. 4 illustrates this effect for a light ray 32 as it travels along the cut away portion of the optical fiber 21 between arrows IV—IV of FIGS. 3 and 3b. (FIG. 4 is a magnified top view of the cut away portion along arrows IV—IV of FIGS. 3 and 3b). Let's assume that the angle of incidence $\theta$ for light ray 32 is 55°. If the index of refraction for the core 22 is 1.61 (typical for one kind of crown glass) and the index of refraction for the cladding 24 is 1.41 (typical for another kind of crown glass), then the critical angle $\theta_C$ is 61.1. Since the angle of incidence $\theta$ for light ray 32 is less than the critical angle, light ray 32 will pass through the core-cladding interface into the cladding 24, as shown by arrow 34. Note that had the optical fiber 21 not been bent, light ray 32 would have remained within the core 22 since the angle of incidence for light ray 32 would not have been less than the critical angle $\theta_C$ of 61.1°.

The closer the windings of the spiral-shaped optical fiber 21 are to the center of the spiral, the more bent become the turns of the spiral-shaped optical fiber 21. In other words, the spiraling turns of the optical fiber 21 are much sharper near the center than they are near the periphery. The sharper turns lead to proportionately more of the light rays incident at the core-cladding interface to pass through into the cladding. This is because a sharp turn vis-à-vis a less sharp turn causes more of the light rays incident at the core-cladding interface to have acute angles of incidence which are less than the critical angle $\theta_c$. Notwithstanding the greater percentage of light rays escaping the optical fiber 21 near the center of the spiral than at the periphery, the illumination provided by such spiral-shaped optical fiber 21 can still be uniform. Uniform illumination is possible because there is a greater number of light rays in the core 22 of the optical fiber 21 at the periphery than near the center of the spiral due to the fact that the light coupling means 30 is coupled to the optical fiber 21 at the periphery of the spiral (see FIGS. 3 and 3b). Thus, by manipulating the appropriate variables (e.g., indices of refraction for the core 22 and the cladding 24), the number of light rays escaping the optical fiber 21 along a given length of the spiral can be made fairly equal. This way, uniform illumination is achieved.

Figure 5:
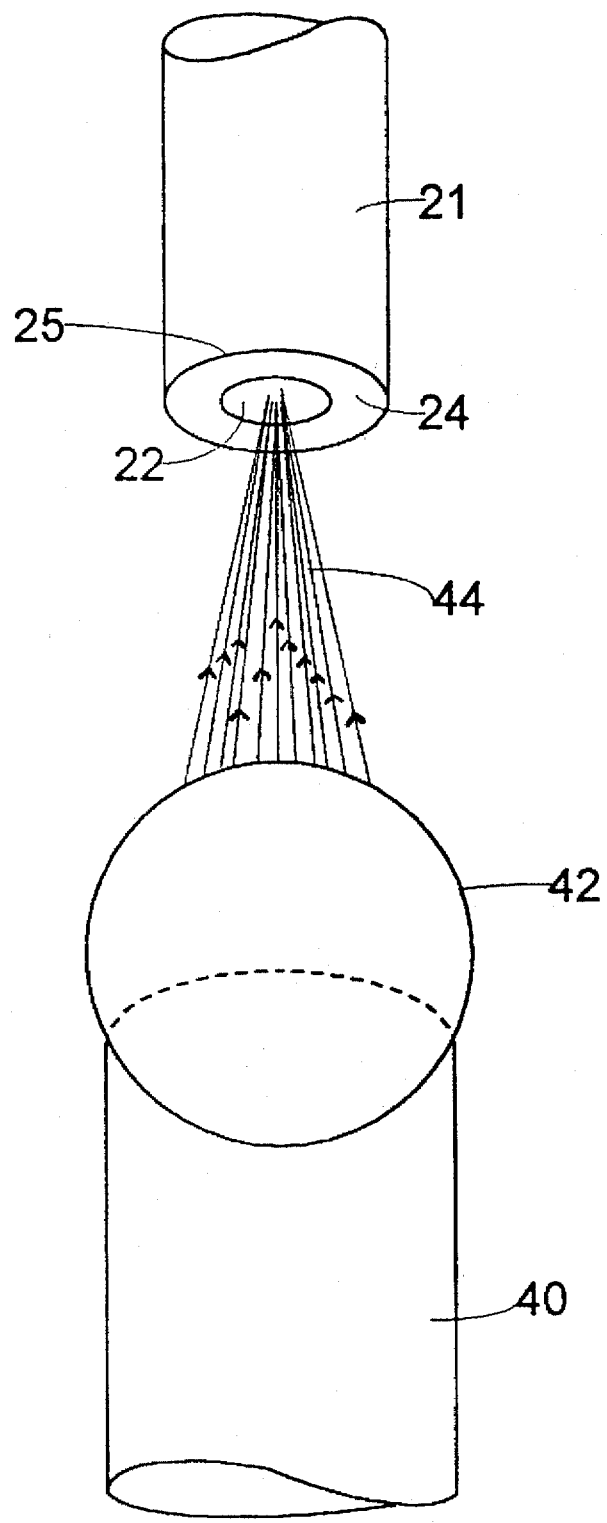
FIG. 5 shows a light source and a ball lens, where the ball lens focuses light rays from the light source to the optical fiber.

FIG. 5 shows the light coupling means 30 of FIGS. 3 and 3b. A light source 40, which is preferably an incandescent lamp, is coupled to a means for focusing the light 44 from the light source 40 to the core 22 at the outer end 25 of the optical fiber 21, shown here as a ball lens 42. Even though the preferred light source 40 for the present invention is an incandescent lamp, other light sources may also be used. For example, light emitting diodes (LEDs) and laser beam systems may be utilized. A monochromatic (one color) LED, specifically a red LED, may actually be preferred where the lighting system of the present invention is to be applied in nighttime or similarly dark environments. This is because the human eye's sensitivity to reduced light environments is not as adversely affected by red light as it is by other colored lights. To elaborate, human eyes become more sensitive as the amount of light decreases. After the eyes have adjusted to a low-light condition, even temporary exposure to light (before the low-light condition is restored), such as white light, eliminates the eyes' increased sensitivity to the darkened condition for a period of time. However, exposure to red light following the eyes' adaptation to a low-light condition has virtually no effect on the eyes' increased sensitivity to the darkened condition. Therefore, in a setting where the eyes' increased sensitivity to a low-light condition should be maintained, such as in a cockpit of an airplane, the various instruments would preferably be backlit via red LEDs.

Figure 6A:
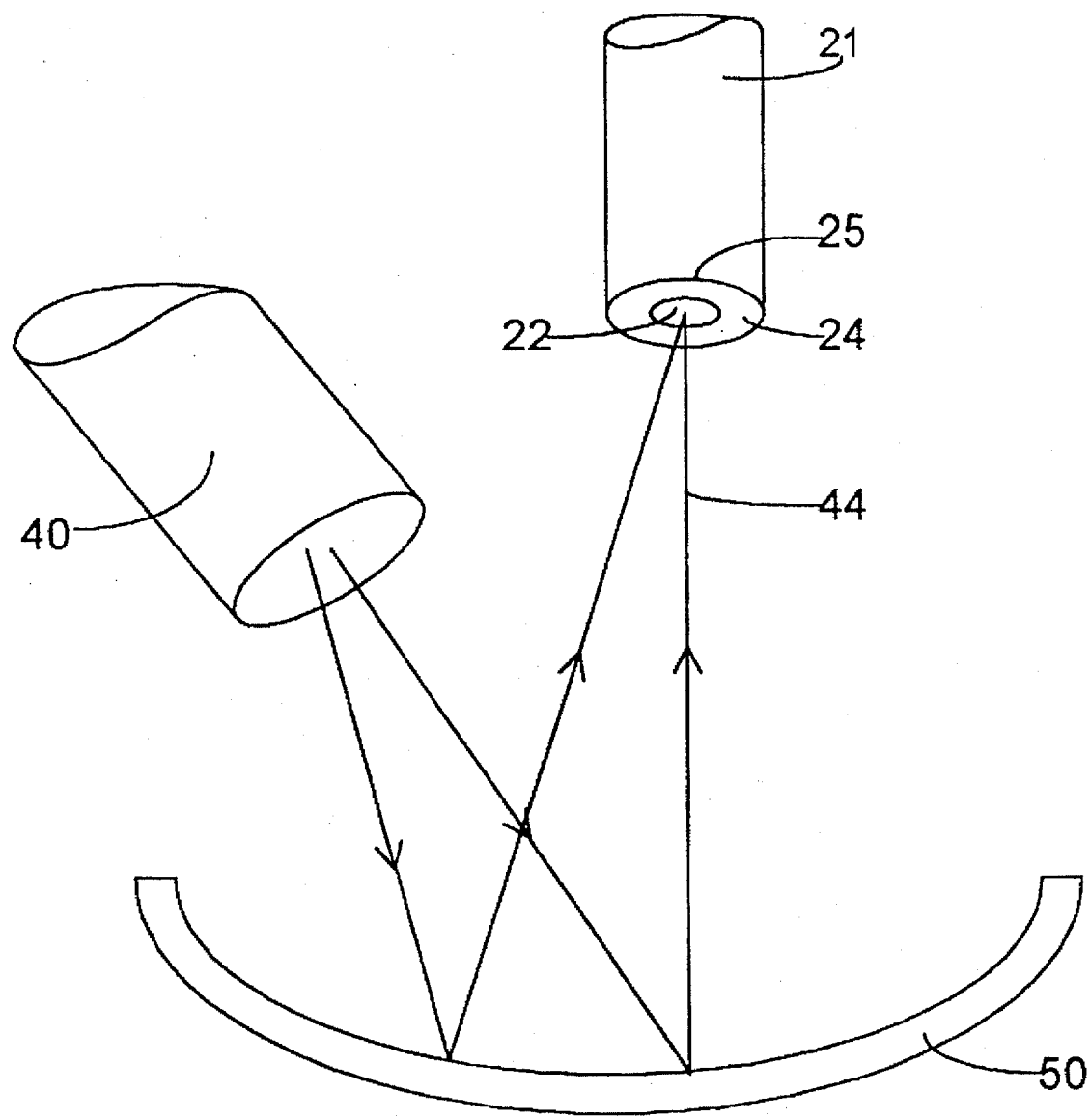
FIG. 6a shows the light source and a parabolic mirror, where the parabolic mirror focuses light rays from the light source to the optical fiber.
Figure 6B:
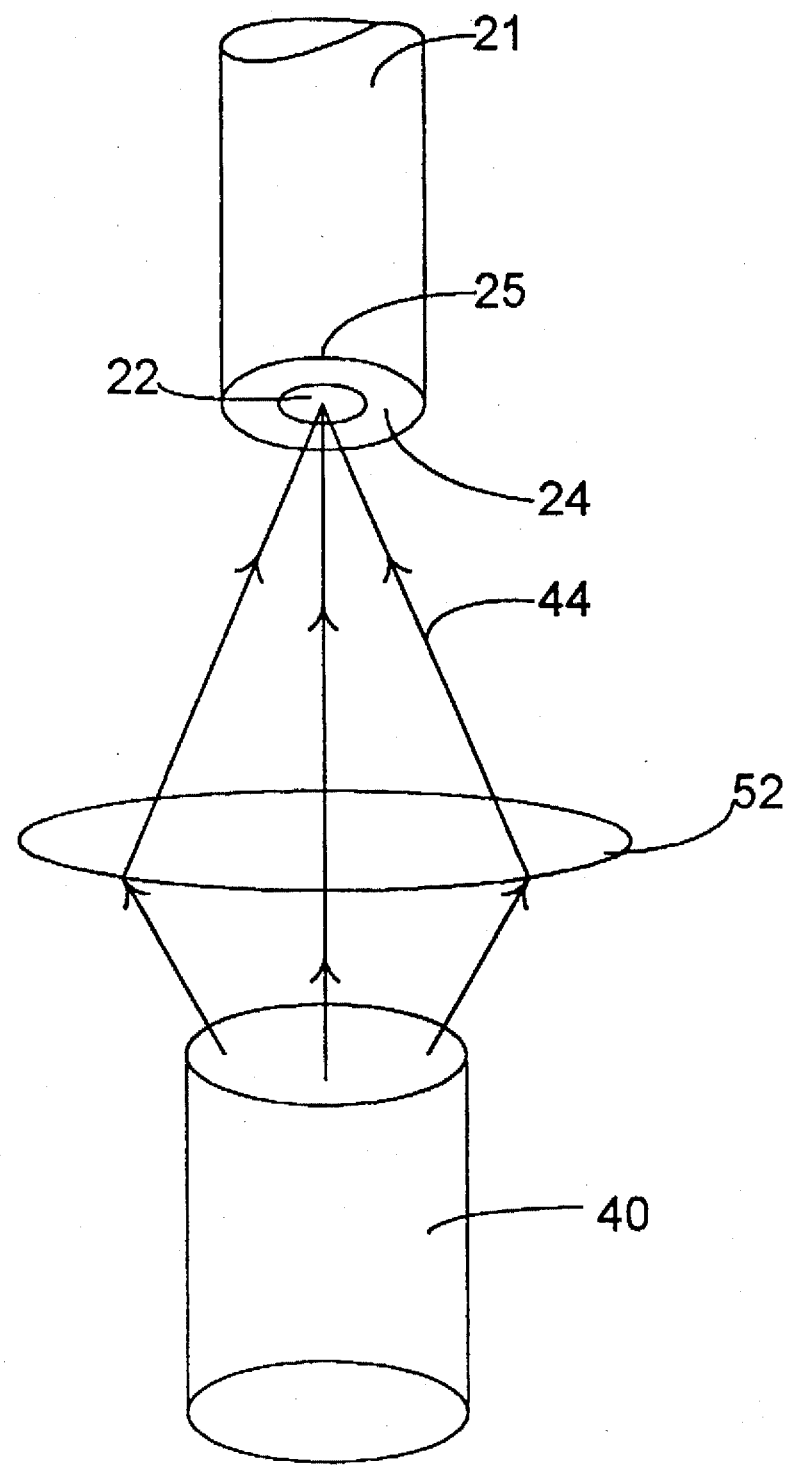
FIG. 6b shows the light source and a thin-lens type of magnifying glass, where the thin-lens magnifying glass focuses light rays from the light source to the optical fiber.

The light 44 emitted by the light source 40 is focused into the core 22 of the optical fiber 21 at the outer end 25 by the means for focusing light, illustrated in FIG. 5 as the ball lens 42. Note that the ball lens 42 is situated partially within the lip of the light source 40 such that all light emanating therefrom goes through the ball lens 42. The calculation for determining where to position the optical fiber 21 relative to the ball lens 42 (of a given diameter) so that light rays 44 emerging from the ball lens 42 are focused at the core 22 at the outer end 25 of the optical fiber 21 is well-known; thus, it will not be discussed herein. Other known means (a non-exhaustive list) for focusing light 44 into the core 22 at the outer end 25 of the optical fiber 21 are: a parabolic mirror 50, as shown in FIG. 6a; a spherical mirror, which works in a similar manner as the parabolic mirror 50; and a thin-lens type of magnifying glass 52, as shown in FIG. 6b.

Figure 7:
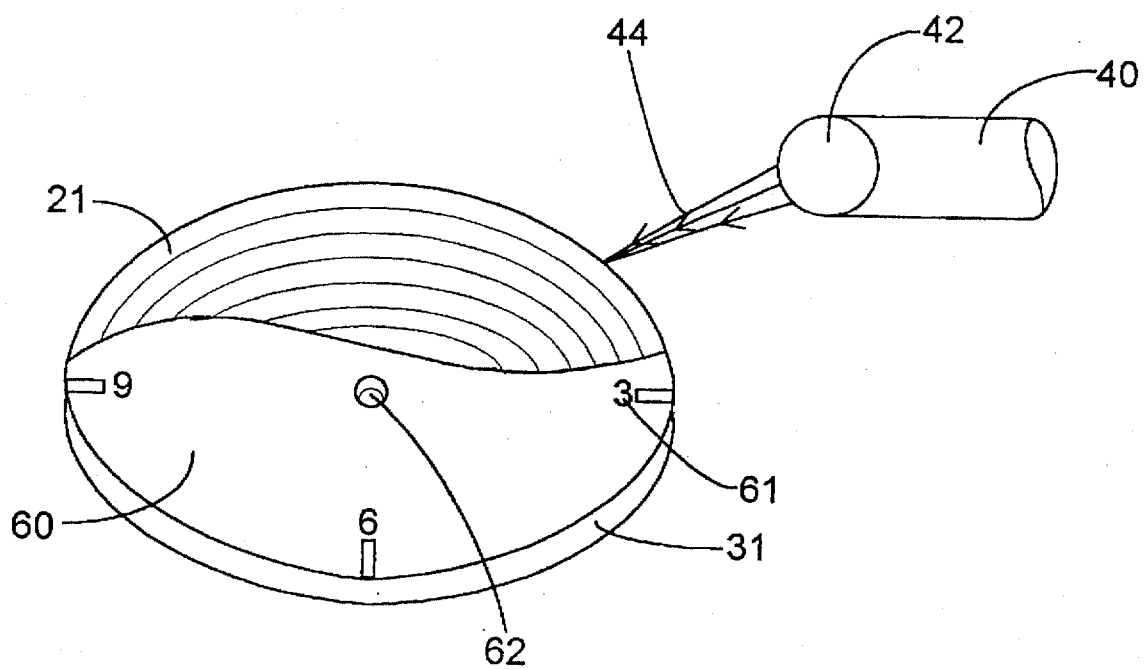
FIG. 7 illustrates the lighting system of FIG. 3b being utilized to provide backlighting for an analog timepiece.

An application of the second embodiment of the present invention is shown in FIG. 7. In FIG. 7, the spiral-shaped optical fiber 21 lighting system 20 of FIG. 3b is utilized to provide backlighting for an analog timepiece. On top of the optical fiber 21 and the casing 31, there is positioned an analog timepiece dial 60 having indicia 61 and a central aperture 62. The dial 60 may be a conventional translucent analog dial of the type presently used by timepiece manufacturers or it may be a transparent analog dial. The central aperture 62 accommodates rotatable stems (not shown), upon which are mounted time indicating hands (not shown). A portion of the dial 60 has been cut away to reveal the windings of the spiral-shaped optical fiber 21 below. The light rays 44 from the light source 40 are focused into the core 22 of the optical fiber 21 at the outer end 25 (not visible in FIG. 7) via the ball lens 42. As described above, virtually all of the light rays emanating from the lighting system 20 will be used to illuminate the analog timepiece dial 60.

Figure 8:
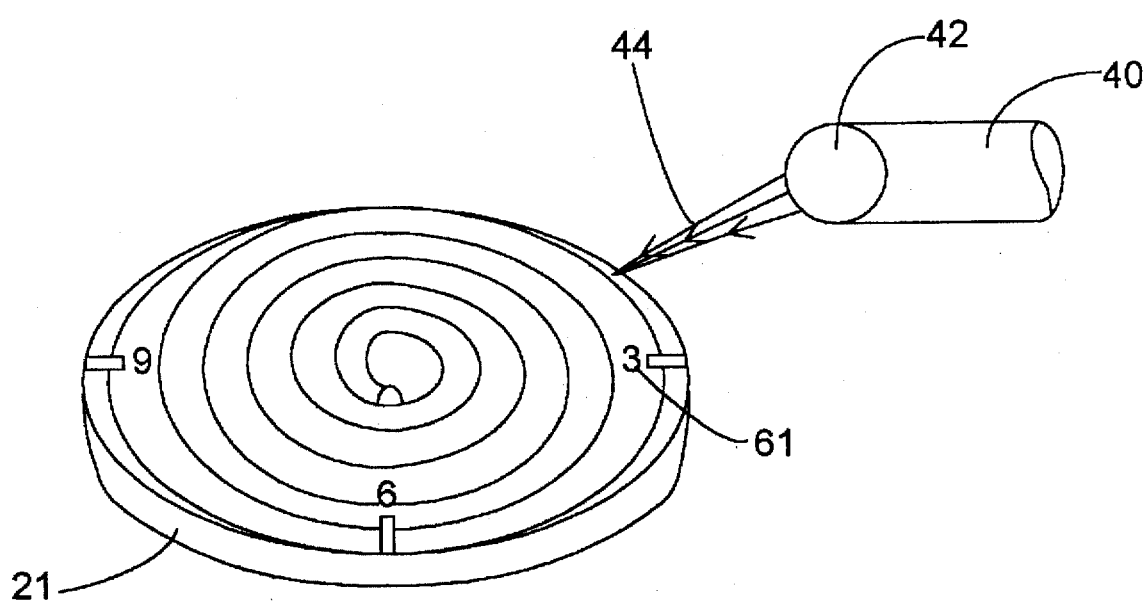
FIG. 8 illustrates the lighting system of FIG. 3 dually serving as a lighting system for an analog timepiece and a dial of the analog timepiece.

FIG. 8 illustrates the first embodiment of the present invention (FIG. 3) dually serving as a lighting system for an analog timepiece and a dial of the analog timepiece. Note that the indicia 61 are printed (or affixed by means of an adhesive) directly on top of the optical fiber 21 so that there is no need for a separate timepiece dial.

While there has been described what is considered the preferred embodiment of the invention, modifications of the present invention will occur to those skilled in the art, and it is desired to secure in the appended claims all such modifications as fall within the true spirit and scope of the invention.

We claim:

1. A lighting system, which comprises:

an optical fiber comprising a core and cladding, where a refractive index of the core is higher than a refractive index of the cladding;

the optical fiber being wound in a spiral shape comprising a plurality of turns, where the spiral shape optical fiber has an outer end;

a light source;

means for focusing the light from the light source to the core at the outer end of the spiral shape optical fiber; and a casing enclosing the spiral shape optical fiber along a periphery and a bottom, except for an aperture to permit the core at the outer end of the spiral shape optical fiber to receive light from the light source, the casing having a reflective inner surface.

2. The lighting system according to claim 1, wherein the light source is an incandescent lamp.

3. The lighting system according to claim 1, wherein the light source is a light emitting diode.

4. The lighting system according to claim 1, wherein the means for focusing the light comprises a ball lens.

5. The lighting system according to claim 1, wherein the reflective inner surface of the casing comprises a mirror.

6. The lighting system according to claim 1, wherein the reflective inner surface of the casing comprises an aluminum foil.

7. A backlighting system for illuminating a dial of a timepiece, which comprises:

an optical fiber wound in a spiral shape comprising a plurality of turns, where each turn is contiguous to at least one other turn, the spiral shape optical fiber having an outer end;

a light source;

means for focusing the light from the light source to the outer end of the spiral shape optical fiber;

a casing enclosing the spiral shape optical fiber along a periphery and a bottom, except for an aperture to permit the outer end of the spiral shape optical fiber to receive light from the light source, the casing having a reflective inner surface; and the dial of the timepiece being positioned on top of the casing.

8. A lighting system for illuminating a dial of a timepiece, which comprises:

an optical fiber wound in a continuously curving spiral shape comprising a plurality of turns, where each turn is contiguous to at least one other turn, the spiral shape optical fiber having an outer end;

a light source;

means for focusing the light from the light source to the outer end of the spiral shape optical fiber; and timekeeping indicia positioned directly on top of the spiral shape optical fiber.

* * * * *